(12) United States Patent
Harrison (10) Patent No.: US 12,462,975 B2
(45) Date of Patent: Nov. 4, 2025

(54) POWER SUPPLY APPARATUS

(71) Applicant: Energy Research Lab Ltd, London (GB)

(72) Inventor: Lee Harrison, London (GB)

(73) Assignee: QBYSS Ltd, London (GB)

( * ) Notice: Subject to any disclaimer, the term of this patent is extended or adjusted under 35 U.S.C. 154(b) by 147 days.

(21) Appl. No.: 18/035,126

(22) PCT Filed: Nov. 3, 2021

(86) PCT No.: PCT/GB2021/052852
§ 371 (c)(1),
(2) Date: May 3, 2023

(87) PCT Pub. No.: WO2022/096877
PCT Pub. Date: May 12, 2022

(65) Prior Publication Data
US 2024/0014688 A1    Jan. 11, 2024

(30) Foreign Application Priority Data

Nov. 3, 2020 (GB) ..................................... 2017411

(51) Int. Cl.
*H01F 38/14* (2006.01)
(52) U.S. Cl.
CPC .................................... *H01F 38/14* (2013.01)
(58) Field of Classification Search
CPC .. H02J 50/12; H02J 50/402; H02J 3/02; H02J 3/12; H02J 5/00
See application file for complete search history.

(56) References Cited

U.S. PATENT DOCUMENTS

| | | |
|---|---|---|
| 2002/0060918 A1 | 5/2002 | Drobnik |
| 2011/0149606 A1 | 6/2011 | Ho |
| 2014/0225439 A1 | 8/2014 | Mao |
| 2015/0131329 A1 | 5/2015 | Chen |
| 2020/0321876 A1 | 10/2020 | Mao |

FOREIGN PATENT DOCUMENTS

| | | |
|---|---|---|
| GB | 2597724 A | 2/2022 |
| GB | 2597727 A | 2/2022 |
| GB | 2597735 A | 2/2022 |

OTHER PUBLICATIONS

GB2017411.6 Combined Search and Examination Report dated Apr. 22, 2021.
GB2017411.6 Examination Report Under Section 18(3) dated Feb. 13, 2023.
GB2017411.6 Search Report dated Apr. 21, 2021.
(Continued)

*Primary Examiner* — Daniel Cavallari
(74) *Attorney, Agent, or Firm* — Woodard, Emhardt, Henry, Reeves & Wagner, LLP (57) ABSTRACT

According to the invention there is provided a HFAC power supply configured to be powered by a DC supply, the HFAC power supply comprising a power circuit, a load circuit and a controller, the power circuit and the load circuit being inductively coupled, the power circuit comprising a voltage regulator configured to output an output voltage, a DC to AC driver and a driver circuit comprising an LC resonant bridge circuit and a primary inductor inductively coupled to the load circuit.

16 Claims, 8 Drawing Sheets

(56) References Cited

OTHER PUBLICATIONS

Chakraborty S et al, "Experimental Evaluation of Active Filtering in a Single-Phase High-Frequency AC Microgrid", IEEE Transactions on Energy Conversion, IEEE Service Center, Piscataway, NJ, US, vol. 24, No. 3, Sep. 1, 2009 (Sep. 1, 2009), p. 673-682, XP011269470.
Jain Praveen et al, "A Review of High-Frequency Power Distribution Systems: For Space, Telecommunication, and Computer Applications", Aug. 1, 2014 (Aug. 1, 2014), vol. 29, No. 8, p. 3852-3863,. XP011544106.

POWER SUPPLY APPARATUS

TECHNICAL FIELD

The invention relates to a power distribution system for distributing variable high frequency alternating current (HFAC), in particular a power distribution system whereby the HFAC output supply is generated from a DC power supply. The HFAC power system is for inductively connected loads on a power bus.

BACKGROUND

Conventional electrical mains distribution systems and the grid as we know it usually supply electricity at 90-264 V AC and the frequency 47-63 Hz, depending on the jurisdiction. Electrical products are either hard wired with connectors or junction boxes using a variety of mains power connection plugs and sockets or other permanently fixed connection systems. Standard mains voltage is known to be potentially hazardous to work on due to the frequency of 47-63 Hz and all connections to an installation with the exception of simply plugging in appliances with traditional mains plugs require the expertise of qualified and agency-approved electricians.

Furthermore, AC Power presents a danger of electrocution which is exacerbated in wet conditions or when there are exposed or damaged cabling or connections. When providing power in outside environments, for example, communal play areas, gardens, swimming pools, around ponds, parks and elsewhere, additional safety procedures must be legally followed, for example, the use of IP6x water proof junction boxes, armoured cables and resin filled connector blocks. Not only can this be notoriously difficult and time consuming but it has to be professionally installed by qualified electricians and carries a potential electrical shock risk to the installer and the consumer and a fire risk to property in the event of a fault or damage.

Increasing the frequency of the AC supply above 10 kHz provides a safe alternative to traditional potentially dangerous AC power distribution, providing a system whereby appliances may be connected inductively, taking the improved safety aspect of HFAC one step further as the power/load circuit is inductively coupled to a HFAC power supply. High frequencies, typically in excess of 10 kHz are used so that efficient inductive power transfer can take place.

As electrical devices and components are inductively powered, installation is quicker and simpler and furthermore does not carry the same risks of electrocution in any condition, even in wet environments.

Inductively coupled loads and power supplies using HFAC are known and have been in use for some time. For example, NASA trialed HFAC in the 1980s during experiments for the space station. As a further example, U.S. Pat. No. 4,264,827 describes a power cable that uses a twisted wire pair which is short circuited at both ends. So as to couple to the bus transformer core, elements are connected to the twisted wire pair so that the wires form a single turn transformer winding about each of two legs of the core elements. An output winding suitably placed on the core element of the cable driver will be inductively coupled to the twisted wire pair and can be used to draw power for a load. The core elements which connect through the twisted wire are formed by two parts which can be formed as a U-I shape, an E-I shape, U-U shape or E-E shape with the 'legs' of the U or E being inserted between twists of the twisted wire pair cable. The device of U.S. Pat. No. 4,264,827 was designed for aviation use as a way of providing power to various locations of an aircraft without galvanic connections. In other contexts there are various disadvantages, including the required use of a relatively high voltage as the power supply.

Known HFAC systems use a constant current mode of operation which can cause the output voltage, which is proportional to load, to be high as the load increases. This can compromise the safety as high voltage HFAC can cause burns. It is not uncommon to generate over 400 V AC output voltage in these HFAC systems. More importantly, these systems also may become dangerous in wet and especially fault conditions, due to the constant current mode of operation. During fault conditions they are able to supply the current directly into the faulty circuit, causing thermal failure modes where temperatures have been witnessed to be high enough to melt cables, plastic enclosures and ceiling tiles, setting off smoke detectors and putting buildings into darkness. Due to the nature of these constant current systems, in the event of a faulty load the main HFAC power supply will continue to drive the faulty load at high current until the inevitable thermal runaway that follows causes complete failure. These HFAC systems are typically controlled by hard-wired control systems, have limited if any user interface to control the power supplies and have been used primarily if not solely for small scale lighting applications.

WO 2010/106375 provides another example of a power distribution system for HFAC, which again uses a constant current HFAC as the main power supply. In this case the power distribution system is designed for use with mains electricity as the input power and for supplying power to a lighting system, in particular to a lighting system using LEDs. An output cable in the form of a twisted wire pair is used in a fashion similar to U.S. Pat. No. 4,264,827, with inductively coupled loads being attached to the twisted wire pair via a transformer-type arrangement, which is again similar to that disclosed in U.S. Pat. No. 4,264,827. This system effectively adopts the same basic principles as U.S. Pat. No. 4,264,827 to provide power for domestic installations and similar lighting systems. Systems with a potential for very high AC voltages at 50 kHz with peak currents approaching 3 A as described in WO 2010/106375 can be potentially dangerous, especially in fault conditions. Should the output cable become disconnected, dangerous voltages at high frequency introduce a burn risk as well as an electric voltage shock risk, also causing connected loads to be damaged.

Conventional HFAC products operate at a fixed current, fixed frequency and, beginning at cable lengths as short as 10M, standing wave problems have been identified by the inventors. As the cable length increases the HFAC output waveform is progressively degraded. The issue is exacerbated by progressively higher loads. This causes poor current regulation and overdriving of inductively connected devices as the peak currents in the HFAC cable increase in line with the rise in standing wave elements. Noise from the standing waves causes power supplies to deliver higher power than is safe to do so. Some prior art systems designed to operate at a fixed constant current have been seen to lose control of their current regulation when the loads are varied or increased, for example as lighting is taken from a low dimmed state to full brightness. Dangerous system conditions can result in which increases in current, to more than 75% of their intended designed operating condition, have been seen.

The loss of current regulation worsens significantly as output cables reach 100M in length due to the standing wave issues and as the subsequent noise on the HFAC power bus increases. The regulation of current may degrade to a point whereby the sine wave output waveform is heavily distorted and only vaguely resembles a sine wave. Additionally, individual devices connected inductively are typically designed to run at a safe rating. For example, a LED may be designed to run at 700 mA and may be configured to do so (via a transformer) while being powered by a power bus operating at a typical 1.5 A in prior art examples. However, when the control of the current of the operating bus is lost and the current increases to circa 3 A, the LED will operate at approximately 1200 mA. Powering any device above its maximum rating will reduce the life of the device considerably. Driving LEDs above their maximum rating will shorten the life of the LED considerably, whilst at the same time shortening the life of the HFAC driver and the HFAC converter as both will be operating almost 67% above their designed operating points. In the case of lighting systems, every light fitted to the HFAC bus will be overdriven, eventually leading to premature system failures. In the past these have caused thermal system failures with catastrophic end results in which devices connected to the HFAC bus slowly overheat causing them to melt undetected in ceiling spaces before they eventually fail, causing noxious odours and potential for smoke (and fire?) damage to buildings.

The fact that prior art examples of HFAC operate at a constant frequency and a constant current over their complete load curve contributes to the problems described above. Furthermore, known HFAC systems are relatively simple in their operation, allowing minimal user control with little or no indication of status, fault conditions, power level etc. and no connection to building management systems, fire systems, security systems or the internet for safety control. More importantly, the inventors have found that some of the prior art examples may fail in an unsafe manner, causing burn (and fire?) risks in addition to electric shock risk. Prior art systems consist of various elements, but fundamentally, single outputs with twisted pair cables for carrying the HFAC power.

SUMMARY

Aspects and examples of the invention are set out in the appended claims and aim to address the technical problems set out above and related problems.

In an aspect there is provided a high frequency alternating current (HFAC) power supply for an HFAC power distribution system, the HFAC power distribution system comprising a power bus carrying HFAC for powering a plurality of inductively powered devices placed along the power bus, the HFAC power supply being configured to be powered by a DC supply, the HFAC power supply comprising a power circuit and a controller, the power circuit being arranged for inductive coupling with a load circuit comprising the power bus, the power circuit comprising:

- a voltage regulator configured to regulate the DC supply to output an output voltage;
- a DC to AC driver powered by the output voltage from the voltage regulator; and
- a driver circuit comprising an LC resonant bridge circuit and a primary inductor inductively coupled to the load circuit, the power supply further comprising a load detector configured to detect an electrical signal of the load circuit and wherein the controller is configured to control the value of the output voltage of the voltage regulator based on the detected electrical signal of the load circuit. For example, the controller may be configured to control the voltage output from the regulator based on the current in the load circuit, for example based on the current carried in the power bus.

According to the invention there is provided a high frequency AC power supply configured to be powered by a DC supply, the high frequency AC power supply comprising a power circuit, a load circuit and a controller, the power circuit and the load circuit being inductively coupled, the power circuit comprising a voltage regulator configured to output an output voltage, a DC to AC driver, and a driver circuit comprising an LC resonant bridge circuit and a primary inductor inductively coupled to the load circuit. The voltage regulator aids the generation of a stable DC output and an HFAC power supply can be generated from any DC power supply. For example, an HFAC power supply can be generated from an auxiliary power socket in a car. As an HFAC power supply can be generated using a DC power supply an HFAC power supply could be quickly set up in a variety of situations. As examples, an HFAC power supply could be set up at the site of a road or rail emergency, for emergency repairs on a road or a railway, or in the event of a natural or industrial or remote disaster.

The controller may be configured to control the value of the output voltage from the voltage regulator. There may be a load detector configured to detect the electrical signal of the load circuit and the controller may be configured to control the value of the predetermined voltage based on the detected electrical signal of the load circuit.

The voltage regulator may comprise a boost converter for use when the DC input is low. The voltage regulator may comprise a buck converter or a low dropout regulator, which is used when the DC input is high. As an alternative the voltage regulator may comprise a buck boost converter, a cuk converter and/or a push pull converter. The power supply may comprise one or more of these voltage regulators. It may further comprise a detector for detecting the DC input and selecting and using the most suitable voltage regulator.

Detecting the electrical signal of the load circuit may comprise detecting one or more of the voltage of the load circuit, the current of the load circuit, the frequency of the load circuit or the power of the load circuit. The load detector may alternatively, or additionally, be configured to detect the total harmonic distortion of the output waveform.

The driver circuit may comprise an LC resonant bridge circuit and a primary inductor inductively coupled to the load circuit, the driver circuit having a variable capacitance and wherein the controller is configured to control the variable capacitance in response to the detected electrical signal on the load circuit. As further examples, the driver circuit may be, for example, an LLC circuit, an LCL circuit or an LCL-T circuit.

The controller may be configured to control the DC to AC converter in response to the electrical signal.

The controller optimally comprises a digital signal processor, a microcontroller or FPGA.

The load circuit has a variable frequency of 10 kHz to 350 kHz. It may furthermore have one or more peripheral devices inductively coupled to the load circuit and powered by the high frequency AC power supply. The load circuit may comprise a pair of side-by-side wires.

For high input voltages the voltage regulator is configured to adjust the output voltage to between 300-450V. For low input voltages the voltage regulator may be configured to adjust the output voltage to between 80V-120V.

The HFAC power supply may be configured to be connected to an auxiliary power socket in a vehicle. These are conventionally 12V or 24V. Alternatively, or additionally, the power supply may be configured to be connected to a battery.

According to the invention there is provided a method of controlling the current on a load circuit of an HFAC power supply powered by a DC input which entails controlling the output of a voltage regulator in response to the load detected on the load circuit.

Due to the automatically controlled method of operation in real time, variable current, variable resonance, variable frequency and variable power, the power bus in the load circuit can extend over much longer distances than current known or prior art systems, without incurring the previously discussed standing wave issues.

BRIEF DESCRIPTION OF DRAWINGS

Embodiments of the disclosure will now be described, by way of example only, with reference to the accompanying drawings, in which.

SPECIFIC DESCRIPTION

Figure 1:
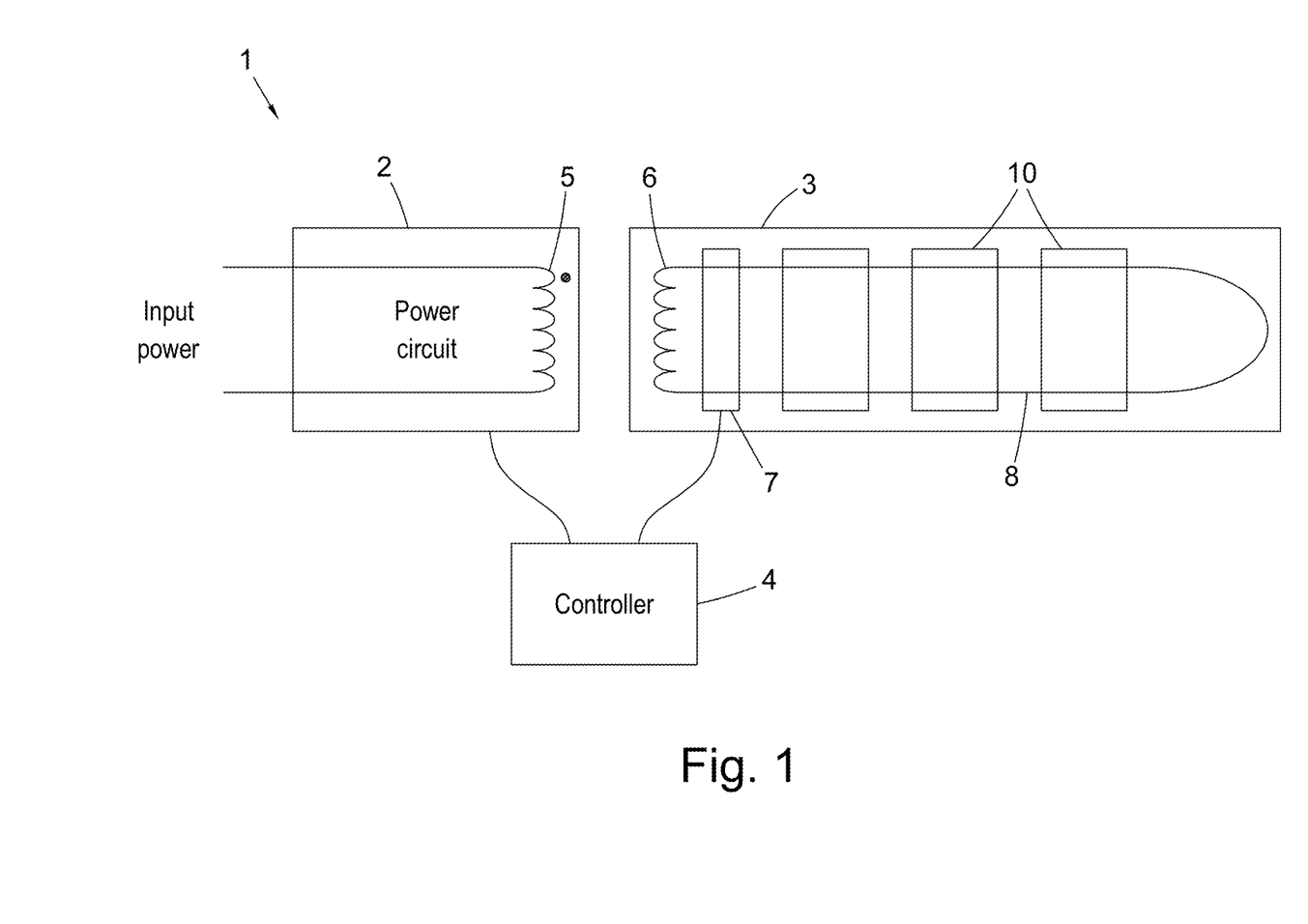
FIG. 1 depicts a power distribution system according to an embodiment of the invention.

FIG. 1 of the accompanying drawings depicts a power distribution system 1. The power distribution system comprises a power circuit 2, a controller 4 and a load circuit 3. The input power is from an AC source such as mains electricity, a generator or renewable sources such as solar, wind or wave. The input power is supplied to the power circuit which then modifies the electrical waveform. The power circuit and the load circuit are inductively coupled by a transformer with the primary inductor 5 on the power circuit and the secondary inductor 6 on the load circuit. The load circuit comprises a power bus 8 which is formed by a loop of insulated wire. The wire of the loop may be arranged as side by side wires and does not need to be twisted. Along the power bus are a plurality of device drivers 10 for peripheral devices. The peripheral devices may be, for example, lights, sensors, battery chargers, audio devices, cameras, irrigation devices, motors. Arranged on the load circuit is also a load detector 7 which is used to detect characteristics of the electrical signal on the power bus. The load detected may detect one or more of the current, the voltage, the power, the frequency, noise and/or the waveform on the power bus. The load detector transmits details of the electrical signal to the controller 4 which then controls variables of the power circuit to ensure that the electrical signal on the load circuit remains stable and within acceptable boundaries ensuring optimal performance under all load and line conditions. The load detector may be connected to the controller either by a wire or wirelessly and may be built into the power supply. The controller may be a DSP, a microcontroller or a FPGA.

In addition to being in communication with the load detector 7 the controller 4 may be controlled by a user wirelessly using for example RF, encrypted RF, Bluetooth or WiFi devices. The user may be able to specify operating conditions such as operating frequency and power levels.

Figure 2:
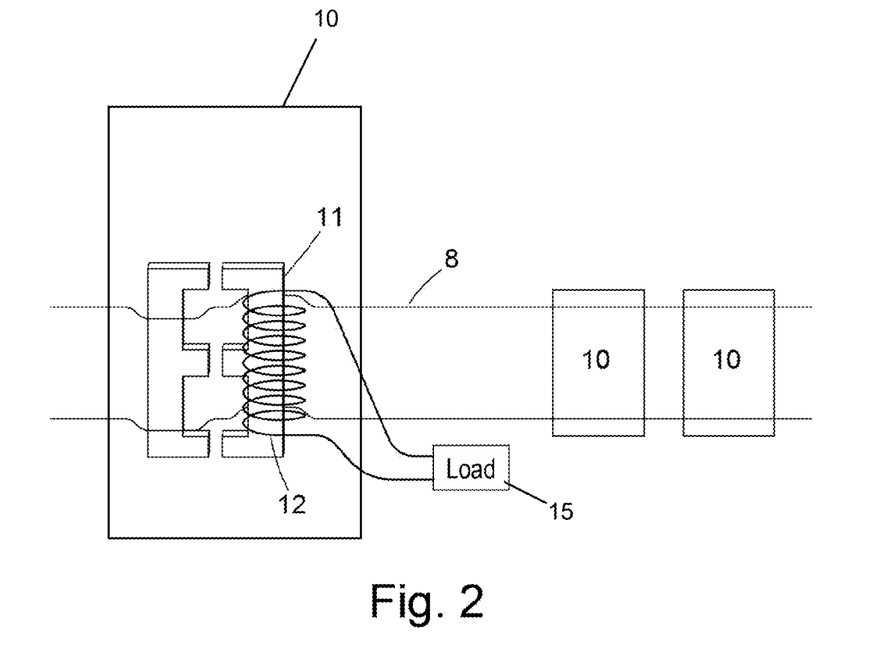
FIG. 2 depicts a device driver coupled to a power bus of a load circuit.

FIG. 2 depicts a device driver 10 according to the invention inductively coupled to the power bus 8. The power bus provides the primary coupling and a coil of wire 12 provides the secondary coupling. To concentrate the magnetic flux an iron core 11 forms a loop around a portion of the power bus and through the centre of the coil of wire 12. The current induced in the wire coil 12 is used to power a load 15 associated with a peripheral device.

Figure 3:
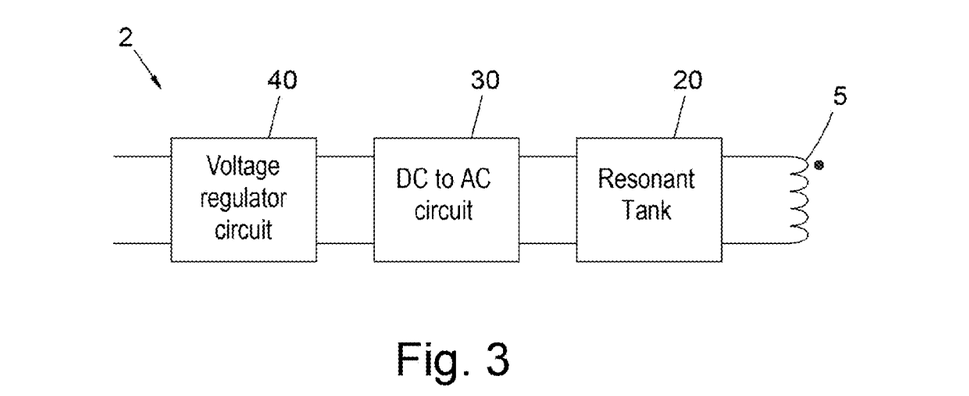
FIG. 3 depicts a schematic diagram of the power circuit according to an embodiment of the invention.

FIG. 3 depicts a power circuit 2, or supply, according to an embodiment of the invention. In this example the power supply is fed by a DC power supply. The power is input into a voltage regulator 40 which converts the voltage to a suitable voltage for the power system. Different arrangements may be used for different input voltages. For example, for a low voltage input of 10-50V the voltage regulator 40 boosts the voltage to, for example 80-120V. For a high voltage input, for example, 100-500V, the voltage regulator 40 decreases the voltage to, 300-450V. Different voltage regulators are discussed in more detail below. The voltage regulator generates a stable voltage at a level suitable for input to the DC to AC converter to generate an HFAC signal. The DC to AC converter is also referred to herein as a DC to AC driver.

Coupled to the voltage regulator is a DC to AC converter 30 with variable clock frequency or sync pulse and variable deadtime control. The DC to AC converter is powered by the regulated DC voltage from the voltage regulator and produces alternating current which is fed to a driver circuit comprising the resonant tank 20 and a primary inductor. The primary inductor 5 forms part of a transformer with a coil 6 on the load circuit and generates an alternating current at a high frequency on the load circuit 3. As described below the frequency of the HFAC circuit can be varied but is in the range 10 kHz to 350 kHz. The system can provide power of up to 1 kW at 0.1-3 A and voltages from zero to 450V AC.

HFAC systems have an optimal operating current. However, when conditions vary, such as with different loads, the current will vary resulting in sub-optimal operating conditions. In this novel HFAC system elements of the power circuit can be varied such that the load circuit continues operating at the desired, optimal frequency. This also ensures that the alternating current is a pure sinusoidal wave. Three different elements of the power circuit can be varied to adjust the current on the load circuit: the resonance of the resonant tank; the voltage regulator, in particular adjusting the output voltage of the voltage regulator; and adjusting the frequency of the DC to AC converter. The current on the load circuit is detected by the load detector and this is used as an input to determine how the different elements of the power circuit are controlled. Although the current is often used, the voltage could alternatively be determined and used as an input to the controller. The different elements of the power circuit (the resonance of the resonant tank, the voltage regulator and the frequency and deadtime of the DC to AC converter) can also be adjusted to optimise the efficiency of the system.

Figure 4:
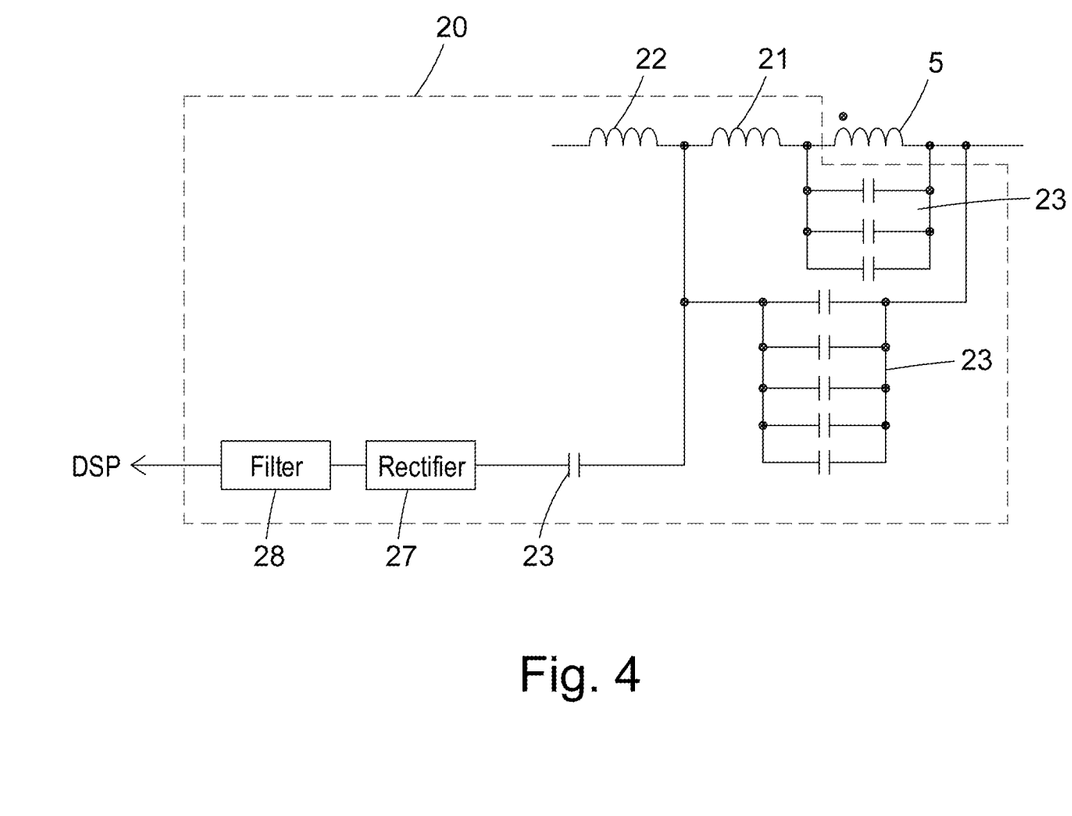
FIG. 4 depicts a resonant tank and primary inductor according to an embodiment of the invention.

FIG. 4 depicts the resonant tank 20 and primary inductor 5. The resonant tank 20 is formed by an LLC circuit with a first inductor 21 and a second inductor 22 and some capacitance. In parallel with the primary inductor 5 is a first variable capacitance 23. In the present embodiment this is formed by a plurality of capacitors in parallel. Different capacitors can be connected or disconnected from the first capacitance by either a switch or a MOSFET (not depicted). In addition to the first variable capacitance 23 there is also a second variable capacitance 24 which is in parallel with the first inductor 21 and the primary inductor 5. Again, different capacitors may be connected or disconnected from the arrangement to give different levels of capacitance.

In the present embodiment the controller 4 is formed by a DSP (digital signal processor) and the DSP controls the variable capacitance levels of both the first 23 and second 24 variable capacitances. The first variable capacitance 23 may have a range of 0-100 nF, with a typical value in use of 33 nF. The second capacitance 24 is greater and has a range of 10-330 nF with a typical value in use of 100 nF. If the load detector 7 (on the load circuit 3) detects an increase in current due to, for example, peripheral devices being removed from the load circuit, or power demand reducing, the digital controller DSP (not depicted in FIG. 4) will decrease the variable capacitance of the first variable capacitance 23. This changes the resonance of the resonant tank to decrease the current on the load circuit. There is therefore decreased power transmitted across the transformer and the current on the load circuit remains stable and within specification. Conversely, if the load detector 7 detects a decrease in current due to, for example, additional peripheral devices being added to the load circuit, or power demand increasing the DSP will increase the capacitance of the first variable capacitance 23 so that the resonance of the resonant tank is changed and the amount of power transmitted across the transformer is increased. The first variable capacitance may be varied because the current changes such that it is out of specification as determined by the DSP. The first variable capacitance can then be varied and the current brought back into specification and remains stable.

A system will have a desired operating current, for example 1.5 A and if the current varies from this because of an increase or decrease in load on the load circuit the system adjusts (by, inter alia, adjusting the resonance of the resonant tank) so that the current remains at the optimal current. Closely monitoring and controlling output current in this way ensures that output current remains within safe, specification levels. Thus the current is regulated and potentially dangerous power levels on the HFAC bus are avoided.

If the load detector 7 (on the load circuit) detects noise, or a small variation in current on the load circuit the DSP 4 will vary the capacitance of the second capacitance 24. For example, if there is a small increase in load current, resulting from noise then the second capacitance may be decreased. If there is a small decrease in load current resulting from noise then the second capacitance may be increased.

Thus the first capacitance 23 is used to control current in response to large changes in load on the load circuit or excessive noise being produced on the HFAC bus due to a load change and the second capacitance 24 is used to respond to smaller changes, or noise, on the load circuit. The power circuit is therefore controlled to respond to changes on the load circuit to ensure that the electrical signal remains stable and is always optimised.

To control the variable capacitance of the resonant tank the load detector typically detects the current and/or the noise on the load circuit. However, a similar result can be achieved by detecting the voltage across the load circuit.

As an alternative, or in addition, to using the load (in particular the current) detected on the load circuit as an input to control the resonant frequency of the resonant tank the current of the resonant tank can be detected. A capacitor is used as part of the resonant tank detector, and may have a value of 220 pF. The current from the resonant tank is rectified 27 and filtered 28 to convert to DC voltage. This DC voltage reflects the current in the resonant tank and gives a very accurate representation of the resonant current. This feature provides a more accurate way of detecting whether the current is at the desired level. For example, a 50 mV DC voltage may indicate a 1.5 A resonant current and a 25 mV DC voltage may indicate a 0.75 A resonant current. The DC voltage can be output to the DSP which determines whether the capacitance of the resonant tank needs to be varied to ensure that the resonant current is at the desired level.

Figure 5A:
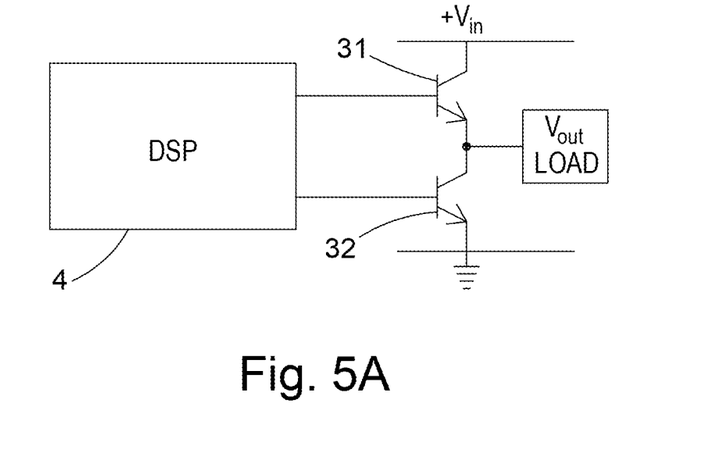
FIG. 5a depicts a half bridge according to an embodiment of the invention.

FIG. 5a depicts a half bridge circuit which converts the DC voltage into an AC current. As can be seen, there are two switching elements 31, 32 which are, in the present embodiment transistors. The timings for the transistors are controlled by a synchronisation pulse generated by the DSP 4. The synchronisation pulse switches the different transistors on and off to generate an alternating current through the output. If the synchronisation pulse increases the transistors will be switched at a greater frequency and the output frequency, and therefore also the frequency on the load circuit (the HFAC frequency), increased.

The DSP can therefore control the HFAC frequency. The frequency may be adjusted because the user has specified a particular operating frequency. This may be via an interface with the DSP, either wirelessly or directly at the equipment. The frequency may also be adjusted to control the power transmitted. If an increased load is detected on the load circuit, by detecting a decrease in the current, the frequency is increased. If a decreased load is detected the frequency is decreased.

The synchronisation signal includes not just a clock signal but on and off times for each of the transistors. Therefore in addition to controlling the output frequency the DSP also controls the dead time (or pulse width modulation) of the half bridge circuit. This may be in response to the frequency changing but it may also be in response to a change in the current on the load circuit which has resulted in the DC voltage from the voltage regulator changing. If the DC voltage increases (in response to the current on the load circuit changing) the dead time of the half bridge may be increased. This is a safety measure to prevent a short circuit. Conversely, if the DC voltage decreases the dead time of the half bridge may be decreased to keep the circuit as efficient as possible. The load detector 7 detects the voltage, or load on the load circuit and the DSP adjusts the synchronisation signal to adjust the dead time of the half bridge accordingly.

The automatic clock frequency and deadtime control offer extremely high levels of efficiency and stability of the HFAC sine wave as the load increases or decreases under both short and long cable lengths.

The synchronisation can also be used to facilitate on-the-fly synchronisation across multiple power supplies. For this, the synchronisation pulse would be used across multiple power supplies.

Figure 5B:
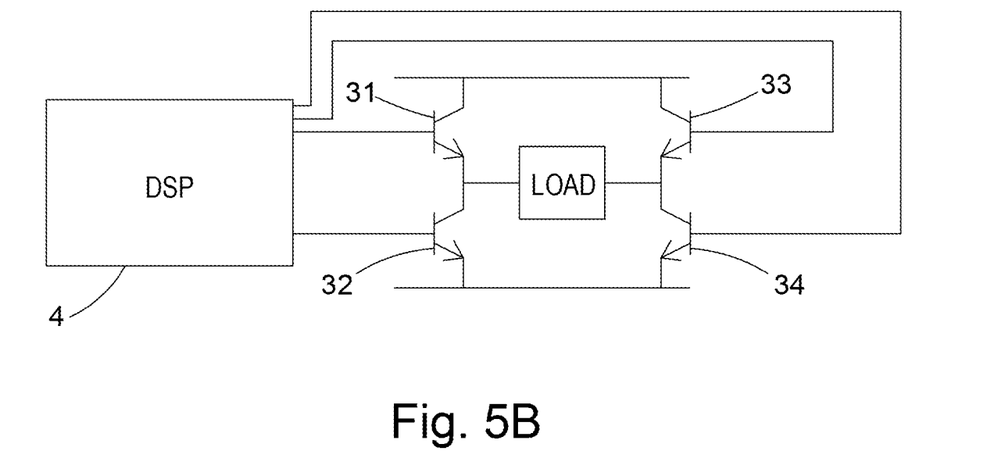
FIG. 5b depicts a full bridge according to an embodiment of the invention.

FIG. 5b depicts a full bridge circuit which can be used as an alternative to the half bridge depicted in FIG. 5a. The full bridge comprises four switching elements 31, 32, 33, 34. In an alternative embodiment both a full and half bridge can be present with the full bridge being used at high power (for example above 500 W) and the half bridge being used at low power (for example up to 500 W).

Figure 6:
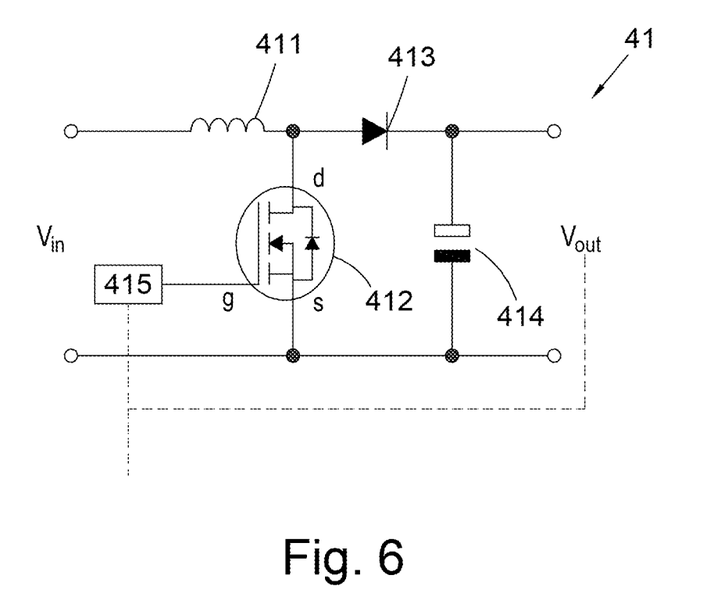
FIG. 6 depicts a boost converter as a voltage regulator.

FIG. 6 depicts a boost converter. This may be used when there is a low voltage input, for example an input voltage of between 10-50V which is boosted to 80-120V. As can be seen there is an inductor 411 a MOSFET 412, a diode 413 and a capacitor 414 which operate as standard boost converter. When an the MOSFET is off current flows to both the output voltage and the capacitor 414, thus storing energy in the capacitor. When the MOSFET is on current flows through the MOSFET and the inductor stores energy. During this period when the MOSFET is on the capacitor 414 is discharging such that the output voltage remains. When the MOSFET is off again, the additional energy stored in the inductor will be discharged.

The output voltage of a boost converter is conventionally given by:

$$V_{out} = \frac{V_{in}}{T_{off}/T}$$

where $T_{off}$ is the time off in the MOSFET signal compared to the period T. Thus to change the output voltage $V_{Out}$ the duty cycle must be changed. For example, to increase the output voltage the off-duty cycle must be decreased.

The voltage regulator has a microcontroller 415 which has an input from $V_{out}$ from the load circuit and also from the controller 4. When the load detector detects low currents (and therefore low loads) the controller controls the MOSFET, via a microcontroller 415, such that the off duty cycle is decreased. To increase the output voltage of the boost converter 41 the off duty cycle is decreased. In this way the output of the voltage regulator can be controlled based on the detected load. For example, if a low load is detected there may be an output voltage of 80V whereas if a high load is detected there may be an output voltage of 120V.

Furthermore, the microcontroller 415 may form part of a feedback loop with the detected $V_{out}$ signal from the voltage controller. Microcontroller 415 detects whether $V_{out}$ is at the right level (i.e. the level specified by the DSP). To regulate the voltage the voltage regulator output voltage is monitored, averaged and filtered to eliminate the noise from the signal within software. The computed average is then compared to a reference voltage in the microcontroller 415 and the voltage regulator output regulated by off duty cycle, as described above. This feedback loop ensures that the output voltage is at the desired output for the current required.

Although FIG. 6 depicts a MOSFET as a switching device, the skilled person will appreciate that any switching device can be used, particularly ones in which the duty cycle can be altered.

Figure 7:
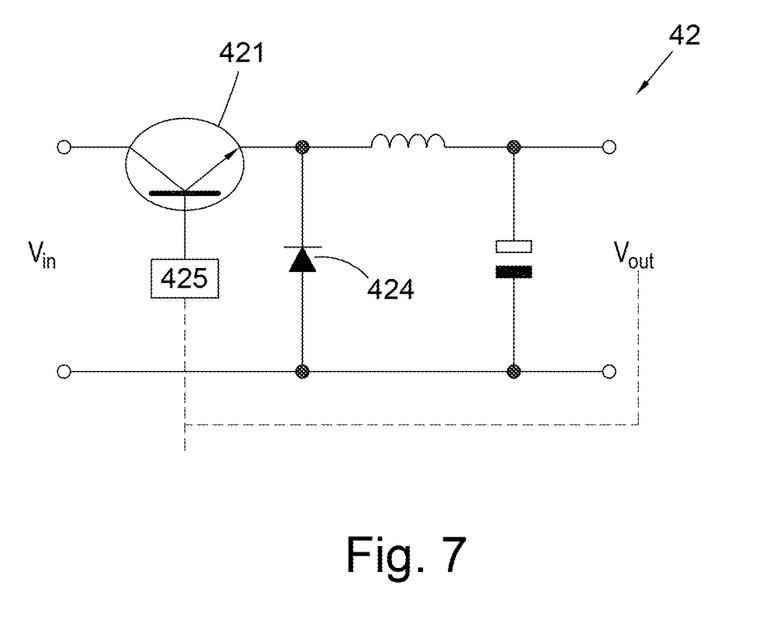
FIG. 7 depicts a buck converter as a voltage regulator.

When a high input DC voltage is used a buck converter 42 may be used as a voltage regulator, as depicted in FIG. 7. Unlike a boost converter this reduces the voltage to a specified level. When the switching transistor 421 is on current from the input source flows and energy is stored in inductor 422 and capacitor 423. When the transistor is off the inductor releases its stored energy and then the capacitor then becomes the main source of current. The diode 424 prevents current flowing the wrong way.

The output voltage of a buck converter is conventionally given by:

$$V_{out} = \frac{T_{on}}{T} V_{in}$$

Where $T_{on}$ is the time on in the switching transistor. Thus the output voltage can be controlled by controlling the duty time on in the cycle. If a higher output voltage is required then the on duty cycle is increased.

The switching signal is controlled by microcontroller 425 which has inputs $V_{out}$ from the load circuit and also from the DSP. When the load detector detects low currents (and therefore low loads) the controller controls the switching transistor, via a microcontroller 425 such the on-duty cycle is reduced so that $V_{out}$ is reduced.

Just as described above in conjunction with FIG. 6 the microcontroller forms part of a feedback loop with $V_{out}$ to ensure that $V_{out}$ is at the desired level.

Figure 8:
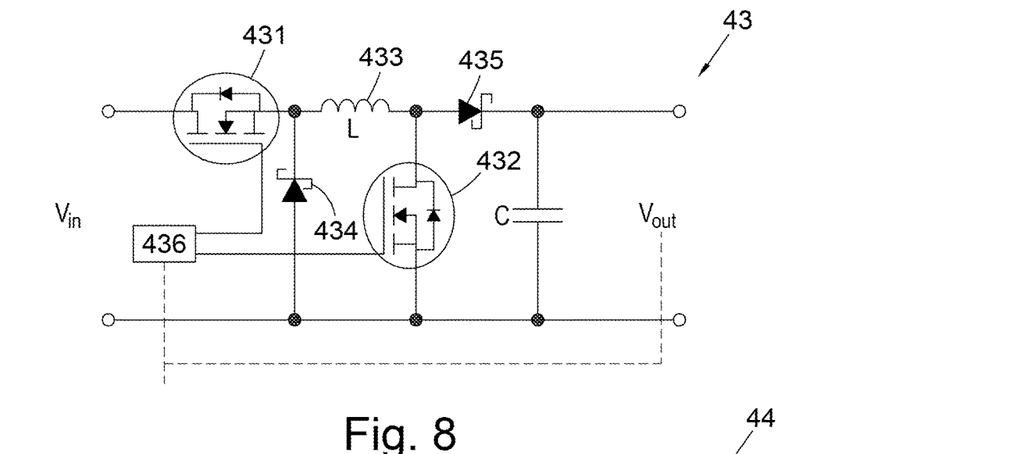
FIG. 8 depicts a boost buck converter as a voltage regulator.

FIG. 8 depicts a buck boost converter 43 which may be used as an alternative voltage regulator. This may be used when the input voltage is unknown or alternatively when a battery is being used, the voltage of which may deplete near the end of its discharge. A further alternative application of a buck boost converter is for use in conjunction with renewable energy sources which may generate variable DC voltages. The buck boost converter can boost the voltage when there is only a low input voltage and reduce the voltage when there is a high input voltage. The buck boost converter has a first transistor 431, a second transistor 432, an inductor 433, a first diode 434 and a second diode 435. A microcontroller 436 controls the duty cycles of the two transistors based on $V_{out}$ and signals from the DSP. In a low current (and therefore low load) is detected the microcontroller 436 controls the duty cycles to increase $V_{out}$. The microcontroller also forms part of a control loop with $V_{out}$.

Figure 9:
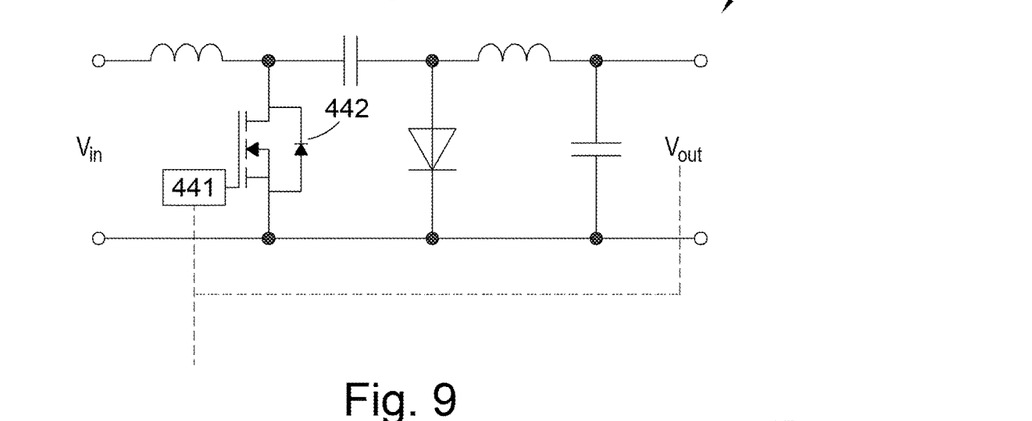
FIG. 9 depicts a cuk converter as a voltage regulator.

FIG. 9 depicts a cuk converter 44 which may be used as an alternative to a buck boost converter as described above. In this, as above, a microcontroller 441 controls the duty cycle of the MOSFET 442 to control $V_{out}$.

Figure 10:
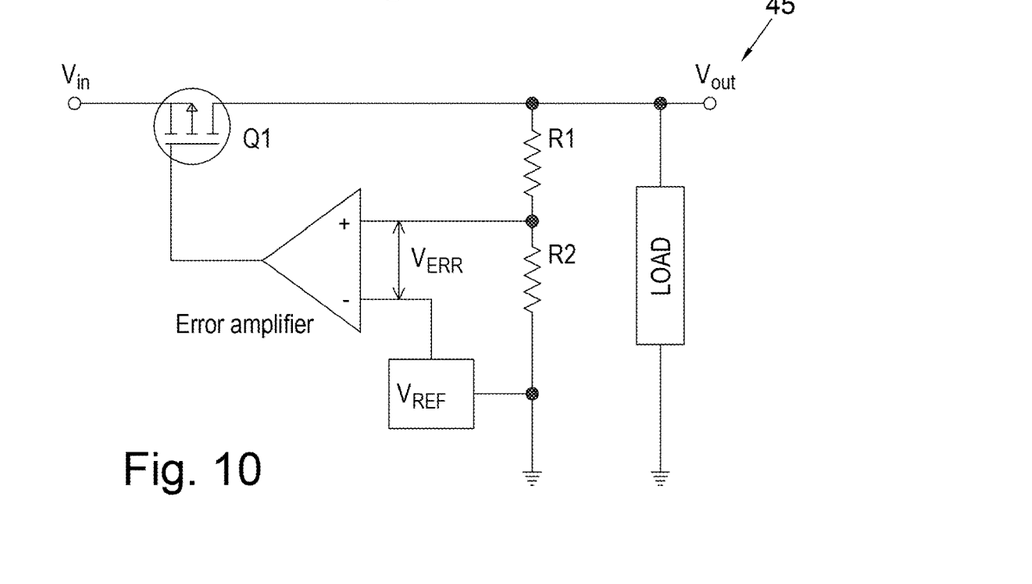
FIG. 10 depicts a low dropout regulator as a voltage regulator.

All of the voltage regulators described above use a switching signal to a switching device. An alternate voltage regulator is a low dropout (LDO) regulator 45, as depicted in FIG. 10. This is more often used when the input voltage is near the required voltage for the DC to AC converter and it regulates the voltage to provide a steady output voltage.

Figure 11:
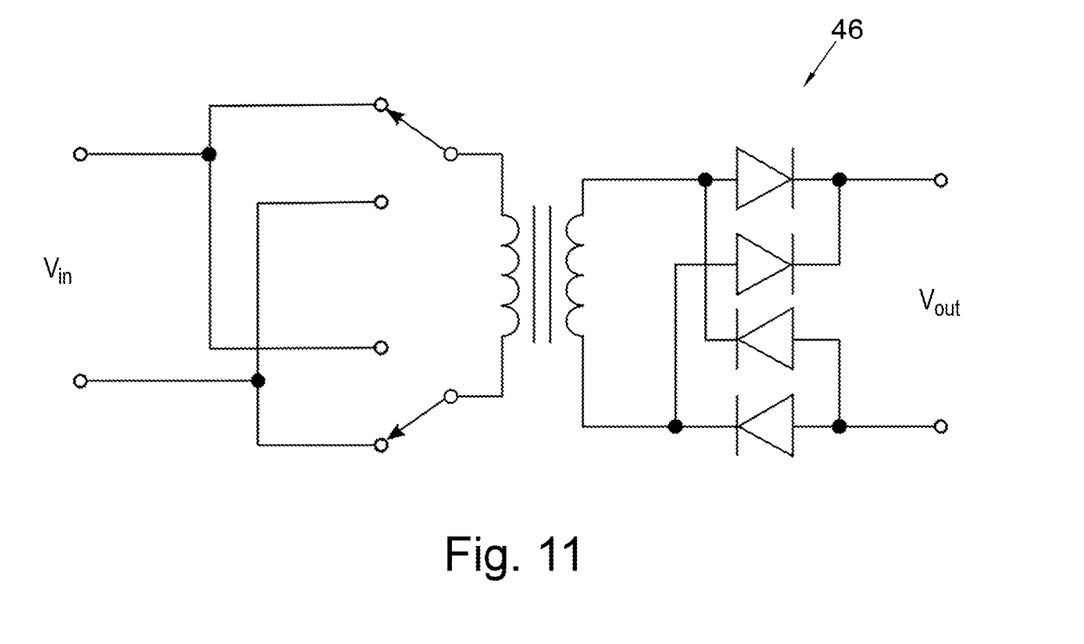
FIG. 11 depicts a push pull converter as a voltage regulator.

FIG. 11 depicts a push pull converter 46 which can be used, for example as an alternative to a buck boost converter. Two switching devices are used in order to generate an alternating current which is then converted using a transformed and converted back to a DC voltage using diodes.

Different types of voltage regulator are described above and a power supply may include one or more of them. The system may include an input detector for detecting the voltage of the input and controller can then control the system such that the most suitable voltage regulator 40 is used.

The input to the power supply may be configured to connect to an auxiliary power socket in a vehicle or alternatively to a battery.

Although FIGS. 4-11 each depict different elements of the power circuit which can be adjusted independently each element described in conjunction with FIGS. 4-11 can be adjusted in combination with one or more of the others. For example the variable capacitance of the resonant stage (described in conjunction with FIG. 4) may be adjusted and controlled in combination with the voltage regulator. This may also be done in combination with control of the frequency and dead time in the half bridge circuit. This arrangement gives the optimum control of the frequency and current in the load circuit.

The system may have an optimum operating current but the system may also have a range of operating currents, for example 0.1-2.5 A. Different current values may be used in different scenarios. For example, the user may want a lower current value when lower power is required or a higher current value when a higher power is required. The system would then operate to keep the current at this value such as by adjusting the capacitance, frequency or operation of the voltage regulator as described above.

The load detector may detect a plurality of characteristics of the load circuit. Although the current can be detected and used as an input for the DSP, the voltage or power of the load circuit could also be used as an alternative input for the DSP. The load detector 7 may also detect the total harmonic distortion (THD) the output waveform on the load circuit. The THD of the output waveform indicates the level of noise in the electrical signal. The total harmonic distortion may also be used as an input for the DSP to adjust the characteristics of the power circuit. Often the current is used for coarse adjustments to the power circuit: for example as an input to adjust the first capacitance, the operating frequency and large adjustments to the output voltage of the voltage regulator. The THD may then be used as an input to make finer adjustments to the characteristics of the power circuit: for example as an input to adjust the second capacitance, finer adjustments to the operating frequency and finer adjustments to the output voltage of the voltage regulator 40.

Through the detection of total harmonic distortion/noise standing waves can be detected and the controller can adjust elements of the power circuit to reduce and eliminate undesirable standing waves.

It is by controlling noise and standing waves that side by side wires, rather than twisted wires can be used. The use of side by side wires, rather than twisted wires facilitates a considerably simpler-to-use system.

Figure 12:
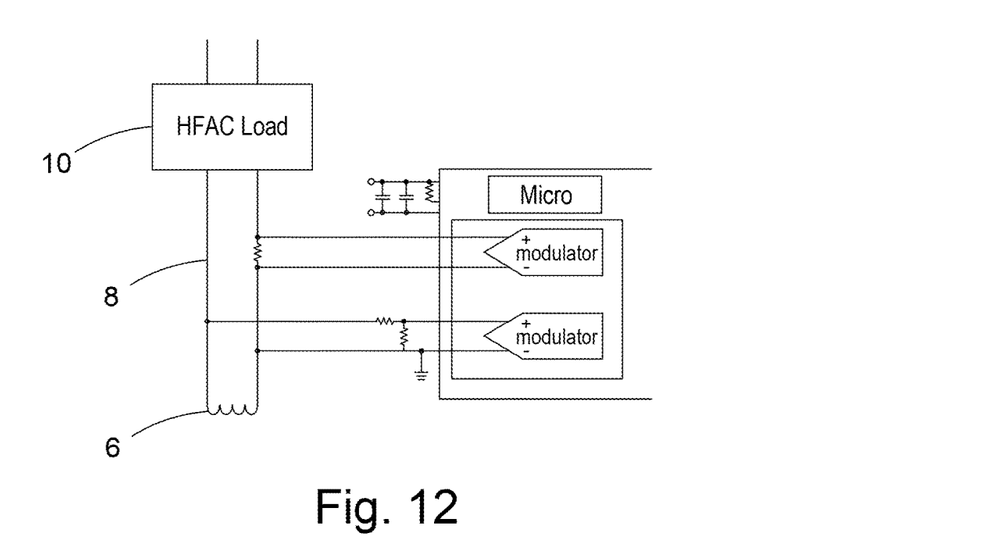
FIG. 12 depicts a power detector.

The load detector 7 may be any detector capable of detecting one or more of the current, load, power, THD of the load circuit. An illustrative load detector is depicted in FIG. 12.

To ensure that the temperature of the system remains within safe limits there may also be one or more temperature sensors arranged on or around the system. These can be connected to the DSP either wirelessly or via a wired connection, but in the preferred embodiment are built into the power supply. The temperature sensors may include an internal ambient temperature sensor, an external ambient temperature sensor, a voltage regulator temperature sensor, an output stage temperature sensor, a transformer temperature sensor and/or resonant inductor sensor temperature sensors. Each of these temperatures may be recorded over time and for each power load so can be used as a reference. As the operating conditions of different power systems will be different the system may use the past data (for example using artificial intelligence) to set a normal operating temperature range for the system. This can provide an early warning to a user: for example, if the temperature is outside a predetermined range the user may be alerted. In addition to, or as an alternative to a user alert the system may also adjust the system to ensure that the temperature remains within safe limits. For example, if the system is overheating it may reduce the power transmitted to the load circuit. This may be achieved by reducing the operating frequency (by adjusting the synchronisation pulse as described in conjunction with FIG. 5), by reducing the capacitance of resonant tank (by either the first capacitance or the second capacitance) or by adjusting the output voltage of the voltage regulator. Thus the system reduces the power to avoid the system overheating and breaking down and provides predictive failure alerts.

As described above, the load detector 7 may comprise a power sensor to measure the power on the load circuit. This can be used as a safety feature to prevent the system operating outside safe limits. A given system will have a given operating range, for example up to 400 W. If the detected power is greater than this range the user may receive an alert. The user could then either reduce the number of peripheral devices on the system or the system could reduce the power transmitted to the load circuit (by the methods described above) such that, for example the lights are dimmer. Alternatively or additionally to alerting the user the DSP may automatically reduce the power transmitted to the load circuit.

The power sensor may also be used as a control for the system. As described above, a user may specify a particular power. For example, a user may wish that there is greater power during the day (for brighter lights) and less power at night, or vice versa. The system can adjust the power supplied by using any of the ways described above such that the power is at a specified value, or within a specified range, which can be measured by the power sensor.

The system provides a method of anticipating and predicting when failure may occur. The system may monitor the current, power, frequency or temperature. For each of these variables there may be an operational range. Alternatively or additional, the system may record the values over time to be used as a reference. If one of these values is out of the operational range, or out of the usual range the controller may transmit an alert to a user. The user can therefore reduce the power of the system, switch it off or take any other necessary action. Alternatively or additionally to a user alert the controller may control features of the system to reduce the power and/or current to avoid catastrophic failure.

When not in active use (i.e. no peripheral devices) the system may be put into a sleep mode to conserve power. In a sleep mode the operating frequency would be increased to a value between 33 kHz-150 kHz. The load detector may detect (either by detecting the current or the power) that there are no loads on the power bus and the controller 4 may then put the system into a sleep mode by a variety of power saving modes including disabling the half bridge circuit and disabling the voltage regulator.

Figure 13:
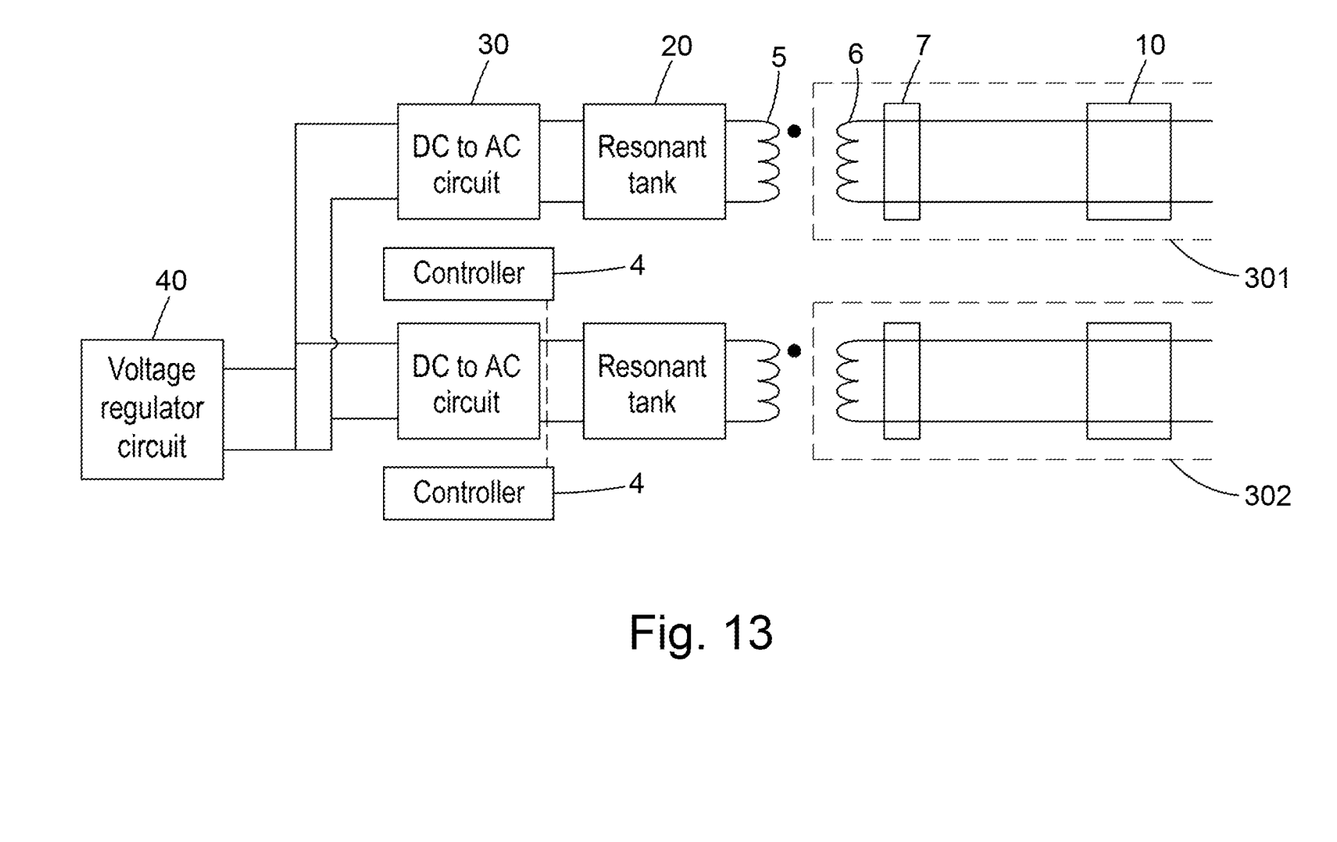
FIG. 13 depicts a power distribution system with a plurality of load circuits.

FIG. 13 depicts a power distribution system with a plurality of load circuits 301 and 302. As can be seen, for each load circuit there is a separate DC to AC converter 30, resonant tank 20 and primary inductor 5. Each load circuit has a controller 4 and a load detector 6 to detect the load on the individual circuit. The variables of the voltage regulator and the different DC to AC converters and resonant tanks are controlled by the respective controller 4. As each load circuit may have different loads the power transmitted to each load circuit can be individually controlled and each load circuit can operate at a different frequency. However, when there are a plurality of load circuits it is desirable to synchronise the frequencies across the different load circuits so a synchronisation signal can be transmitted between the controllers of the different load circuits. As an alternative to different controllers for different load circuits a single controller could be used.

Parameters

In the load circuit various parameters are detected; input and output voltage, input and output power, input and output current, resonant tank voltage, temperature, power factor correction voltage and periodic and random deviation. Based upon these monitoring functions, the controller adjusts the HFAC power supplies output in real time, adjusting output frequency, resonant capacitance and frequency, and output current to maintain the highest possible efficiency at all load conditions and output waveform signal integrity. Thus the frequency, voltage, current and power limit of the AC current can be adjusted and hence also the frequency of the power bus can be adjusted and controlled by the controller.

The table below indicates some of the different variables which may be detected, together with the features which may be adjusted and the resulting effects.

| Variable | Adjust | Effect |
| --- | --- | --- |
| Load circuit current Monitor drift from specified target value | Capacitance of resonant tank | Adjusts load circuit current and voltage |
| Intended load circuit current adjustment | Voltage regulator output voltage | Adjusts load circuit current |
| Load circuit frequency | Synchronisation pulse which adjusts half bridge clock or pulse width modulation | HFAC output frequency |
| Voltage regulator output Voltage | Voltage regulator feedback loop | Load circuit current adjustment |
| Temperature | Any one or more of voltage regulator, synchronisation pulse, or capacitance of resonant tank | Reduce power to safe limits |
| Resonant tank | Capacitance of resonant tank | Load circuit current and noise control |
| Load circuit power | Any one or more of voltage regulator, synchronisation pulse, or capacitance of resonant tank | Control of maximum power |

Furthermore, the software is able to detect standing wave problems should they arise for any reason and take appropriate action to eliminate them, by adjusting the frequency, variable capacitance of the resonant tank, voltage regulator output voltage, or a combination thereof.

In addition, within the preferred embodiment, the HFAC power supply may be configured by a user to conform to SELV voltage requirements, whereby the HFAC power supply will modify its output current and power capabilities to maintain operation to SELV requirements on the HFAC output power bus. This innovative mode of operation and the low voltages produced may facilitate compliance with extra low voltage standards such as SELV, further facilitating safe and user-friendly installations, without the need for specialised installers or qualified electricians.

With the use of SELV then even in jurisdictions with legal restrictions on domestic power supplies a householder will be able to manage a DIY electrical installation. When coupled with inductively connected loads this provides a system that is spark and arc free even in fault conditions.

The preferred embodiment is designed to be implemented for powering HFAC-powered wireless power transmitters, facilitating the wireless charging of wearable and other low power devices, ear pods, watches, game controllers, fitness bands, health monitors etc up to 20 feet away from the power supply and installed loads. It is envisaged within the preferred invention HFAC distribution also enables the use of HFAC powered Li-Fi enabled devices, particularly advantageous as the HFAC output cables can now extend to greater than 400M cable length with no standing wave issues.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments. It is not limited to the disclosed embodiments and that alternative embodiments could be constructed without departing from the scope of the invention as defined in the appended claims.

The invention claimed is:

1. A high frequency alternating current (HFAC) power supply of at least 10 kHz for an HFAC power distribution system, the HFAC power distribution system that includes a load circuit comprising:
 a power bus carrying HFAC for powering a plurality of loads placed along the power bus, wherein the loads are each powered by a corresponding device driver comprising a secondary coil said corresponding device driver being powered by currents induced in the secondary coil by inductive coupling with the power bus; the HFAC power supply being configured to be powered by a DC supply, the HFAC power supply comprising:
 a power circuit, a load detector, and a controller, the power circuit being arranged for inductive coupling via a transformer with a load circuit comprising—the power bus and the plurality of loads, the power circuit comprising:
 a voltage regulator configured to regulate the DC supply to output an output voltage;

a DC to AC converter circuit powered by the output voltage from the voltage regulator; and
an LC resonant tank; and
a primary inductor inductively coupled to the load circuit via a secondary inductor of the load circuit thereby forming said transformer;
wherein the load detector is configured to detect an electrical signal on the power bus and wherein the controller is configured to control the output voltage of the voltage regulator based on the detected electrical signal.

2. An HFAC power supply according to claim 1 wherein the controller is configured control the output voltage of the regulator based on current in the load circuit.

3. An HFAC power supply according to claim 1 wherein the voltage regulator comprises a boost converter.

4. An HFAC power supply according to claim 1 wherein the voltage regulator comprises a buck converter or a low dropout regulator.

5. An HFAC power supply according to claim 1 wherein the voltage regulator comprises one or more of a buck boost converter, a cuk converter or a push pull converter.

6. An HFAC power supply according to claim 1 wherein detecting the electrical signal on the power bus comprises detecting one or more of the voltage of the electrical signal on the power bus, the current of the electrical signal on the power bus, the frequency of electrical signal on the power bus or the power of the electrical signal on the power bus.

7. An HFAC power supply according to claim 1 wherein the LC resonant tank has a variable capacitance and wherein the controller is configured to control the variable capacitance in response to the detected electrical signal on the load circuit.

8. An HFAC power supply according to claim 1 wherein the controller is configured to control the DC to AC converter circuit in response to the electrical signal.

9. An HFAC power supply according to claim 1 wherein the load detector is configured to detect the total harmonic distortion of an output waveform on the power bus, wherein the output waveform is output to the load circuit by the power circuit.

10. An HFAC power supply according to claim 1 wherein the controller comprises a digital signal processor, a microcontroller or FPGA.

11. An HFAC power distribution system, comprising:
a load circuit comprising a power bus for carrying HFAC and a plurality of loads to be powered, the load circuits further comprising:
a plurality of device drivers wherein the plurality of loads are each powered by a corresponding device driver comprising a secondary coil said corresponding device driver being powered by currents induced in the secondary coil by inductive coupling with the power bus;
the HFAC power distribution system further comprising:
an HFAC power supply configured to be powered by a DC supply, the HFAC power supply comprising:
a load detector configured to detect an electrical signal on the power bus;
a controller configured to control the output voltage of the voltage regulator based on the detected electrical signal; and a power circuit arranged for inductive coupling via a transformer with the load circuit, said power circuit having an LC resonant tank and a primary inductor inductively coupled to the load circuit via a secondary inductor of the load circuit thereby forming said transformer;
a voltage regulator configured to regulate the DC supply to output an output voltage; and
a DC to AC converter circuit powered by the output voltage from the voltage regulator.

12. An HFAC power supply according to claim 1 wherein the load circuit has a variable frequency of up to 350 KHz.

13. An HFAC power supply according to claim 1 wherein the voltage regulator is configured to adjust the output voltage between 300V and 450V.

14. A method of controlling the current on a load circuit of an HFAC power supply powered by a DC input comprising controlling the output of a voltage regulator in response to the load detecting on the load circuit.

15. The HFAC Power distribution system of claim 11 wherein the power bus of the load circuit comprises a pair of side by side wires.

16. The HFAC Power distribution system of claim 11 wherein the plurality of loads to be powered are comprised in one or more peripheral devices powered by the HFAC power supply via the plurality of device drivers.

* * * * *